(12) United States Patent
Lima et al.

(10) Patent No.: US 10,941,040 B2
(45) Date of Patent: Mar. 9, 2021

(54) CONTROLLING NANOFIBER SHEET WIDTH

(71) Applicant: Lintec of America, Inc., Richardson, TX (US)

(72) Inventors: Marcio D. Lima, Richardson, TX (US); Julia Bykova, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 274 days.

(21) Appl. No.: 16/114,464

(22) Filed: Aug. 28, 2018

(65) Prior Publication Data

US 2019/0093258 A1    Mar. 28, 2019

Related U.S. Application Data

(60) Provisional application No. 62/579,264, filed on Oct. 31, 2017, provisional application No. 62/561,779, filed on Sep. 22, 2017.

(51) Int. Cl.
*C01B 32/176* (2017.01)
*D01D 5/42* (2006.01)
(Continued)

(52) U.S. Cl.
CPC ............ *C01B 32/176* (2017.08); *C01B 32/16* (2017.08); *D01D 5/42* (2013.01); *D01D 5/426* (2013.01); *D01F 9/12* (2013.01); *D02G 3/16* (2013.01); *B82Y 30/00* (2013.01); *B82Y 40/00* (2013.01); *C01B 2202/06* (2013.01);
(Continued)

(58) Field of Classification Search
CPC ......... C01B 32/176; D01D 5/42; B82Y 40/00
See application file for complete search history.

(56) References Cited

U.S. PATENT DOCUMENTS 6,946,410 B2 * 9/2005 French ................... B82Y 30/00
156/598
7,651,773 B2 * 1/2010 Larouche ................ D01F 9/127
428/408

(Continued)

FOREIGN PATENT DOCUMENTS

WO    2007-015710    2/2007

OTHER PUBLICATIONS

Terrones, Mauricio. "Nanotubes unzipped." Nature 458.7240 (Apr. 15, 2009): 845-846. (Year: 2009).*

(Continued)

*Primary Examiner* — Benjamin A Schiffman
(74) *Attorney, Agent, or Firm* — Greenblum & Bernstein, P.L.C.

(57) ABSTRACT

Techniques are described for controlling widths of nanofiber sheets drawn from a nanofiber forest. Nanofiber sheet width can be controlled by dividing or sectioning the nanofiber sheet in its as-drawn state into sub-sheets as the sheet is being drawn. A width of a sub-sheet can be controlled or selected so as to contain regions of uniform nanofiber density within a sub-sheet (thereby improving nanofiber yarn consistency) or to isolate an inhomogeneity (whether a discontinuity is the sheet (e.g., a tear) or a variation in density) within a sub-sheet. Techniques for dividing a nanofiber sheet into sub-sheets includes mechanical, corona, and electrical arc techniques.

15 Claims, 11 Drawing Sheets

(51) Int. Cl.
| | |
|---|---|
| *D01F 9/12* | (2006.01) |
| *D02G 3/16* | (2006.01) |
| *C01B 32/16* | (2017.01) |
| *D02G 3/44* | (2006.01) |
| *B82Y 30/00* | (2011.01) |
| *B82Y 40/00* | (2011.01) |
| *D01D 10/00* | (2006.01) |
| *D01F 9/127* | (2006.01) |

(52) U.S. Cl.
CPC .... *C01B 2202/08* (2013.01); *C04B 2235/422* (2013.01); *C04B 2235/526* (2013.01); *C04B 2235/5248* (2013.01); *C04B 2235/5264* (2013.01); *D01D 10/00* (2013.01); *D01F 9/127* (2013.01); *D02G 3/441* (2013.01); *D10B 2101/122* (2013.01)

(56) References Cited

U.S. PATENT DOCUMENTS

| | | | | |
|---|---|---|---|---|
| 8,404,174 | B2* | 3/2013 | Nakanishi | B82Y 40/00 |
| | | | | 264/427 |
| 8,540,959 | B2* | 9/2013 | Ziegler | B82Y 40/00 |
| | | | | 423/447.6 |
| 8,658,281 | B2* | 2/2014 | Kim | C01B 32/162 |
| | | | | 428/408 |
| 9,691,526 | B2* | 6/2017 | Feng | C01B 32/168 |
| 10,280,087 | B2* | 5/2019 | Maruyama | B32B 9/007 |
| 10,340,459 | B2* | 7/2019 | Falk | H01L 51/441 |
| 2005/0112051 | A1* | 5/2005 | Liu | B01J 35/0013 |
| | | | | 423/447.1 |
| 2009/0220408 | A1* | 9/2009 | Lee | B82Y 30/00 |
| | | | | 423/447.2 |
| 2012/0000293 | A1 | 1/2012 | Baughman et al. | |
| 2013/0064750 | A1 | 3/2013 | Zettl | |
| 2017/0129182 | A1 | 5/2017 | Sauti et al. | |
| 2017/0233253 | A1* | 8/2017 | Hur | B32B 9/007 |
| | | | | 428/408 |
| 2019/0039904 | A1* | 2/2019 | Fujimoto | C01B 32/162 |
| 2019/0271100 | A1* | 9/2019 | Oh | D01F 9/127 |
| 2019/0368076 | A1* | 12/2019 | Kim | D01F 1/09 |
| 2020/0055733 | A1* | 2/2020 | Takada | C01B 32/162 |
| 2020/0071233 | A1* | 3/2020 | Joo | D01D 5/0076 |
| 2020/0156945 | A1* | 5/2020 | Holmberg | C01B 32/166 |

OTHER PUBLICATIONS

Jiao, Liying, et al. "Narrow graphene nanoribbons from carbon nanotubes." Nature 458.7240 (Apr. 16, 2009): 877-880. (Year: 2009).*

Yuzvinsky, T. D., et al. "Precision cutting of nanotubes with a low-energy electron beam." Applied Physics Letters 86.5 (Jan. 25, 2005): 053109. (Year: 2005).*

Lustig, Steven R., et al. "Lithographically cut single-walled carbon nanotubes: controlling length distribution and introducing end-group functionality." Nano Letters 3.8 (Jun. 25, 2003): 1007-1012. (Year: 2003).*

Elias, Ana Laura, et al. "Longitudinal cutting of pure and doped carbon nanotubes to form graphitic nanoribbons using metal clusters as nanoscalpels." Nano letters 10.2 (Aug. 19, 2009): 366-372. (Year: 2009).*

Park, Ji-Yong, et al. "Electrical cutting and nicking of carbon nanotubes using an atomic force microscope." Applied Physics Letters 80.23 (Apr. 2002): 4446-4448. (Year: 2002).*

Venema, Liesbeth C., et al. "Length control of individual carbon nanotubes by nanostructuring with a scanning tunneling microscope." Applied physics letters 71.18 (Nov. 3, 1997): 2629-2631. (Year: 1997).*

International Preliminary Report on Patentability received for PCT Application No. PCT/US2018/048235. dated Apr. 2, 2020. 11 pages.

Ma, B., "Effects of Corona and Ozone Exposure on Properties of Polymeric Materials for High Voltage Outdoor Applications", Thesis for the Degree of Doctor Philosophy, High Voltage Engineering. Department of Materials and Manufacturing Technology. Chalmers University of Technology. 2011, 17 pages.

Chakroff, J. et al., "Development and Characterization of Novel Electrospun Meshes for Hernia Repair", SOJ Master Science Engineering, May 5, 2015, vol. 3, No. 1, pp. 1-9.

Rahbar, RS et al., "Fabrication of Electrospun Nanofibre Yarn Based on Nylon 6/Microencapsulated Phase Change Materials", Journal of Experimental Nanoscience, Aug. 28, 2016, vol. 11, No. 18, pp. 1402-1415.

PCT Search Report and Written Opinion for PCT Application No. PCT/US18/48235 filed on Aug. 28, 2018, dated Dec. 21, 2018, 16 pages.

* cited by examiner

CONTROLLING NANOFIBER SHEET WIDTH

TECHNICAL FIELD

The present disclosure relates generally to nanofibers. Specifically, the present disclosure relates to controlling nanofiber sheet width.

BACKGROUND

Nanofiber forests, composed of both single wall and multiwalled nanotubes, can be drawn into nanofiber ribbons or sheets. In its pre-drawn state, the nanofiber forest comprises a layer (or several stacked layers) of nanofibers that are parallel to one another and perpendicular to a surface of a growth substrate. When drawn into a nanofiber sheet, the orientation of the nanofibers changes from perpendicular to parallel relative to the surface of the growth substrate. The nanotubes in the drawn nanofiber sheet connect to one another in an end-to-end configuration to form a continuous sheet in which a longitudinal axis of the nanofibers is parallel to a plane of the sheet (i.e., parallel to both of the first and second major surfaces of the nanofiber sheet). The nanofiber sheet can be treated in any of a variety of ways, including spinning the nanofiber sheet into a nanofiber yarn.

SUMMARY

Example 1 is a method for dividing a nanofiber sheet, the method comprising: providing a nanofiber sheet comprising a plurality of nanofiber oriented parallel to a direction in which the nanofiber sheet is drawn, the nanofiber sheet having a first major surface and a second major surface opposite the first major surface; positioning at least one electrode proximate to, and not in direct contact with, at least one of the major surfaces of the nanofiber sheet; applying a voltage to the at least one electrode proximate to the at least one major surface of the nanofiber sheet; generating an electrical discharge at the at least one electrode from the applied voltage; and using the electrical discharge, dividing the nanofiber sheet into two or more sub-sheets by removing a portion of the nanofiber sheet.

Example 2 includes the subject matter of Example 1, wherein positioning the at least one electrode proximate to, and not in direct contact with, a major surface of the nanofiber sheet includes generating a corona that removes the portion of the nanofiber sheet.

Example 3 includes the subject matter of either of Examples 1 or 2, further comprising increasing a size of the portion of the nanofiber sheet that is removed by increasing a magnitude of the applied voltage.

Example 4 includes the subject matter of any of the preceding Examples, wherein positioning the at least one electrode further comprises: placing a first arc discharge electrode proximate to, and not in direct contact with, a first major surface of the nanofiber sheet; placing a second arc discharge electrode proximate to, and not in direct contact with, a second major surface of the nanofiber sheet, wherein the voltage is applied to at least one of the first arc discharge electrode and the second arc discharge electrode; and responsive to the applied voltage, causing an electrical arc to flow between the first arc discharge electrode and the second arc discharge electrode.

Example 5 includes the subject matter of any of the preceding Examples, further comprising: identifying an inhomogeneity in the nanofiber sheet; and positioning the at least one electrode proximate to, and not in direct contact with, the inhomogeneity in the nanofiber sheet.

Example 6 includes the subject matter of Example 5, wherein dividing the nanofiber sheet comprises dividing the nanofiber sheet into at least a first sub-sheet and a second sub-sheet, wherein the inhomogeneity is disposed entirely within the first sub-sheet.

Example 7 includes the subject matter of either of Examples 5 or 6, wherein the inhomogeneity is a tear in the nanofiber sheet.

Example 8 includes the subject matter of any of Examples 5-7, wherein the inhomogeneity is a variation in a number of nanofibers per unit volume of the nanofiber sheet.

Example 9 includes the subject matter of any of the preceding Examples, further comprising: spinning a nanofiber yarn from at least one of two or more sub-sheets; monitoring one or more of a diameter and an electrical property of the nanofiber yarn during the spinning; and re-positioning the at least one electrode proximate to, and not in direct contact with, the nanofiber sheet in response to the monitored diameter or electrical properties of the nanofiber yarn, the re-positioning changing a width of the two or more sub-sheets by relocating the electrical discharge.

Example 10 includes the subject matter of Example 9, wherein re-positioning the at least one electrode reduces a variation in diameter of the nanofiber yarn to less than +/−5% over a length of 1 mm.

Example 11 includes the subject matter of any of the preceding Examples, wherein at least one of the two or more sub-sheets is less than 5 μm in width.

Example 12 includes the subject matter of Example 11, further comprising spinning a nanofiber yarn less than 1 μm in diameter from the sub-sheet less than 5 μm in width.

Example 13 includes the subject matter of any of Examples 11-12, further comprising simultaneously spinning a separate nanofiber yarn from each of the at least two or more sub-sheets.

Example 14 includes the subject matter of any of the preceding Examples, wherein the nanofiber sheet is a carbon nanofiber sheet and wherein carbon nanofibers of the carbon nanofiber sheet are multiwalled carbon nanofibers having a diameter of less than 100 nm.

Example 15 includes the subject matter of any of the preceding Examples, wherein positioning the at least one electrode further comprises placing the at least one electrode proximate to, and not in direct contact with, a major surface of the nanofiber sheet, wherein the applied voltage generates an electrical arc between the at least one electrode and the nanofiber sheet, the electrical arc removing the portion of the nanofiber sheet.

Example 16 is a method for dividing a nanofiber sheet, the method comprising configuring a structure to have at least one salient feature comprising an edge, and at least one reverse salient feature; contacting the nanofiber sheet with an edge of the at least one salient feature; and drawing the nanofiber sheet past the at least one salient feature while maintaining contact therebetween, the drawing causing the nanofiber sheet to be dividing into sub-sheets.

Example 17 includes the subject matter of Example 16, wherein a width of the at least one salient feature is at least 1 μm.

Example 18 includes the subject matter of either of Examples 16 or 17, wherein a height of the at least one salient feature is at least 1 μm.

Example 19 includes the subject matter of any of Examples 16-18, further comprising identifying an inhomogeneity in the nanofiber sheet, and wherein dividing the nanofiber sheet comprises dividing the nanofiber sheet into at least a first sub-sheet and a second sub-sheet, the inhomogeneity disposed entirely within the first sub-sheet.

Example 20 includes the subject matter of Example 19, wherein the inhomogeneity is a tear in the nanofiber sheet or a variation in a number of nanofibers per unit volume of the nanofiber sheet.

Example 21 includes the subject matter of any of examples 19-20, wherein at least one of the first or second sub-sheets is less than 5 µm in width.

Example 22 includes the subject matter of Example 21, further comprising spinning a nanofiber yarn less than 1 µm in diameter from the sub-sheet less than 5 µm in width.

Figure 1:
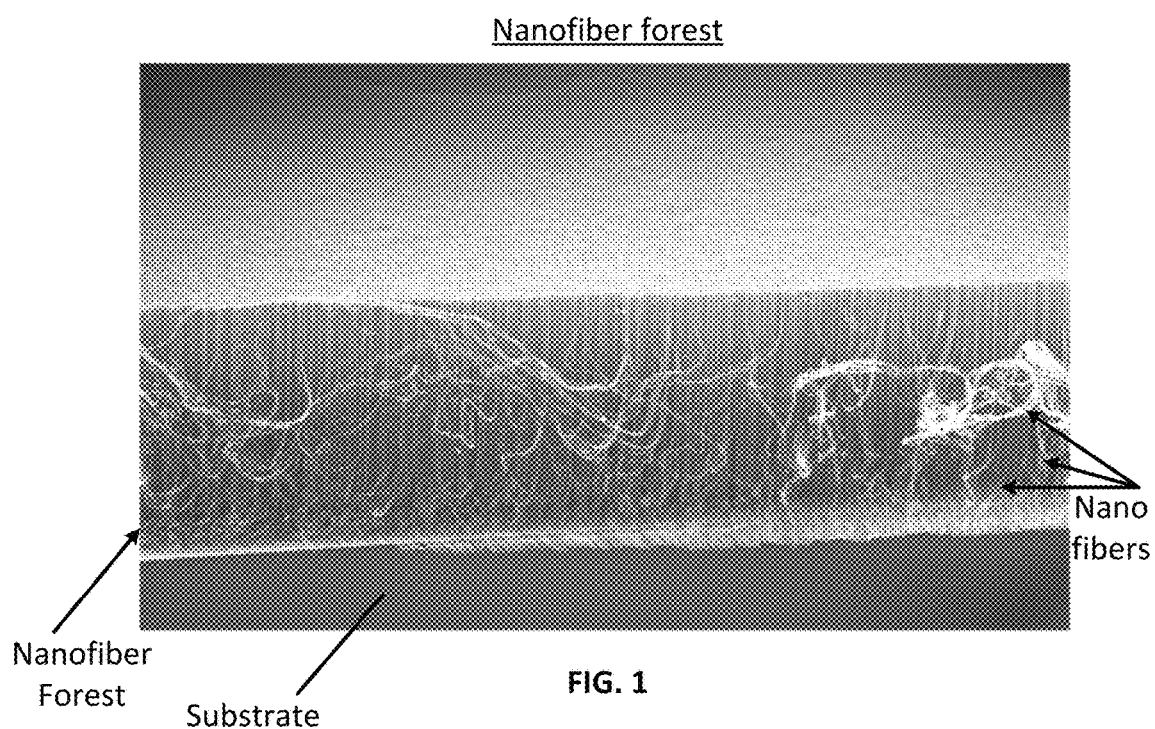
FIG. 1 illustrates an example forest of nanofibers on a substrate, in an embodiment.

The figures depict various embodiments of the present disclosure for purposes of illustration only. Numerous variations, configurations, and other embodiments will be apparent from the following detailed discussion.

DETAILED DESCRIPTION

Overview

Nanofiber sheets drawn from a nanofiber forest can be inhomogeneous for any of a variety of reasons. For example, due to variations in the number of nanofibers per unit area of growth substrate, a density of a nanofiber sheet (both in terms of nanofibers per unit volume and/or mass per unit volume) can vary across one or both a width and a length of the sheet. Because a diameter of a nanofiber yarn spun from a nanofiber sheet is a function of nanofiber density within the sheet, these density variations within a sheet can cause diameter variations within a nanofiber yarn spun from the sheet. In some examples, the diameter variation can be +/−one micron (1 µm) or more. A variability in diameter of one or more microns for a nanofiber yarn having a diameter on the order of tens of microns is a significant deviation. Diameter variation of a yarn can cause variations in mechanical properties (e.g., ultimate tensile strength), and electrical properties (e.g., conductivity), among other properties. These types of variations can make nanofiber yarns less appealing as a material for use in applications that strive for consistent or predictable performance.

Controlling nanofiber density on a growth substrate during nanofiber forest growth can be difficult. Similarly, controlling a density of nanofibers drawn into a nanofiber yarn during the drawing process can also be difficult.

Complicating the control of nanofiber density is the presence of defects within the nanofiber forest. One type of defect is an impurity that is not drawn into the nanofiber sheet or spun into the nanofiber yarn. For example, a particle that is not drawn into a yarn during the drawing process (e.g., a particle that does not have a longitudinal axis, but rather is more sphere-like or irregularly shaped or a particle attached to the growth substrate) can disrupt the drawing of a sheet by causing a sheet to tear or otherwise fail during drawing.

While laser-assisted cutting or blade-based cutting of nanofiber sheets into sub-sheets can be performed, neither of these techniques are flexible and convenient enough to maneuver around defects or be adjusted during the drawing process without damaging the sheet. Nor are laser-assisted cutting or blade-based cutting generally used to maintain a consistent density of a drawn sheet. Thus, the applicability of these techniques in maintaining uniformity of the nanofiber sheet so as to produce a nanofiber yarn with a uniform diameter (e.g., a diameter that varies less than +/−5% from a mean value along a length of the nanofiber yarn) is limited.

Thus, in accordance with an embodiment of the present disclosure, techniques are described for controlling widths of nanofiber sheets drawn from a nanofiber forest. In examples, width of a drawn nanofiber sheet can be controlled by dividing or sectioning the nanofiber sheet in its as-drawn state into sub-sheets as the sheet is being drawn. A width of a sub-sheet can be controlled or selected so as to contain regions of uniform nanofiber density within a sub-sheet (thereby improving nanofiber yarn consistency) or to isolate an inhomogeneity (whether a discontinuity is the sheet (e.g., a tear) or a variation in density) within a sub-sheet. By isolating the inhomogeneity in a sub-sheet, the remaining, uniform, sheets can be spun into yarns that have a consistent diameter. This is more likely to produce a nanofiber yarn having consistent mechanical and electrical properties along its entire length. This consistency in diameter, physical/mechanical properties (e.g., density, tensile strength), and electrical properties makes nanofiber yarns more easily integrated into applications that require consistent and/or predictable properties. In some embodiments, in situ monitoring of nanofiber yarn and/or nanofiber sheet physical properties (e.g., yarn diameter, yarn density, sheet density, sheet width) can be used to position electrodes that generate an electrical arc and/or corona used to divide the nanofiber sheet. By moving the arc(s) and/or corona(s) so as to dynamically change a width of a sub-sheet, a diameter and/or density of a resulting nanofiber yarn can be more consistent (e.g., to a variation in either diameter and/or density of less than 10% (+/−5%)_ over a length of a yarn). Furthermore, some of the embodiment techniques described herein do not require contact between an electrode and the nanofiber sheet that is being divided into sub-sheets. Rather, the dividing is accomplished via an electrical arc and/or corona disposed around one or more electrodes and that bridges a physical separation between a surface of the electrode and the nanofiber sheet being divided. Avoiding direct physical contact between an electrode and the nanofiber sheet has at least two benefits. First, movement of an electrode in response a feedback system used to maintain and/or improve consistency of a nanofiber yarn produced from the nanofiber sub-sheet can be faster because there is no direct physical contact between an electrode and a sheet and thus no friction to overcome and no risk of tearing the nanofiber sheet. Second, the power supplied to the electrode does not have "spikes" (i.e., temporary surges in power), but rather is more uniform over time. This reduces power consumption and reduces the risk of unintentional scorching and/or damage to the nanofiber sheet caused by power surges.

Prior to describing these techniques, a description of nanofiber forest growth, and nanofiber sheet drawing for context.

Nanofiber Forests

As used herein, the term "nanofiber" means a fiber having a diameter less than 1 μm. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be densified using the techniques described below. As used herein, the terms "nanofiber" and "carbon nanotube" encompass both single walled carbon nanotubes and/or multi-walled carbon nanotubes in which carbon atoms are linked together to form a cylindrical structure. In some embodiments, carbon nanotubes as referenced herein have between 4 and 10 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest"). This is illustrated and shown in FIGS. 3 and 4, respectively.

The dimensions of carbon nanotubes can vary greatly depending on production methods used. For example, the diameter of a carbon nanotube may be from 0.4 nm to 100 nm and its length may range from 10 μm to greater than 55.5 cm. Carbon nanotubes are also capable of having very high aspect ratios (ratio of length to diameter) with some as high as 132,000,000:1 or more. Given the wide range of dimensional possibilities, the properties of carbon nanotubes are highly adjustable, or "tunable." While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate. FIG. 1 shows an example forest of nanofibers on a substrate. The substrate may be any shape but in some embodiments the substrate has a planar surface on which the forest is assembled. As can be seen in FIG. 1, the nanofibers in the forest may be approximately equal in height and/or diameter.

Nanofiber forests as disclosed herein may be relatively dense. Specifically, the disclosed nanofiber forests may have a density of at least 1 billion nanofibers/cm$^2$. In some specific embodiments, a nanofiber forest as described herein may have a density of between 10 billion/cm$^2$ and 30 billion/cm$^2$. In other examples, the nanofiber forest as described herein may have a density in the range of 90 billion nanofibers/cm$^2$. The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces. Regardless, a density of nanofibers within a forest can be increased by applying techniques described herein.

Methods of fabricating a nanofiber forest are described in, for example, PCT No. WO2007/015710, which is incorporated herein by reference in its entirety.

Figure 2:
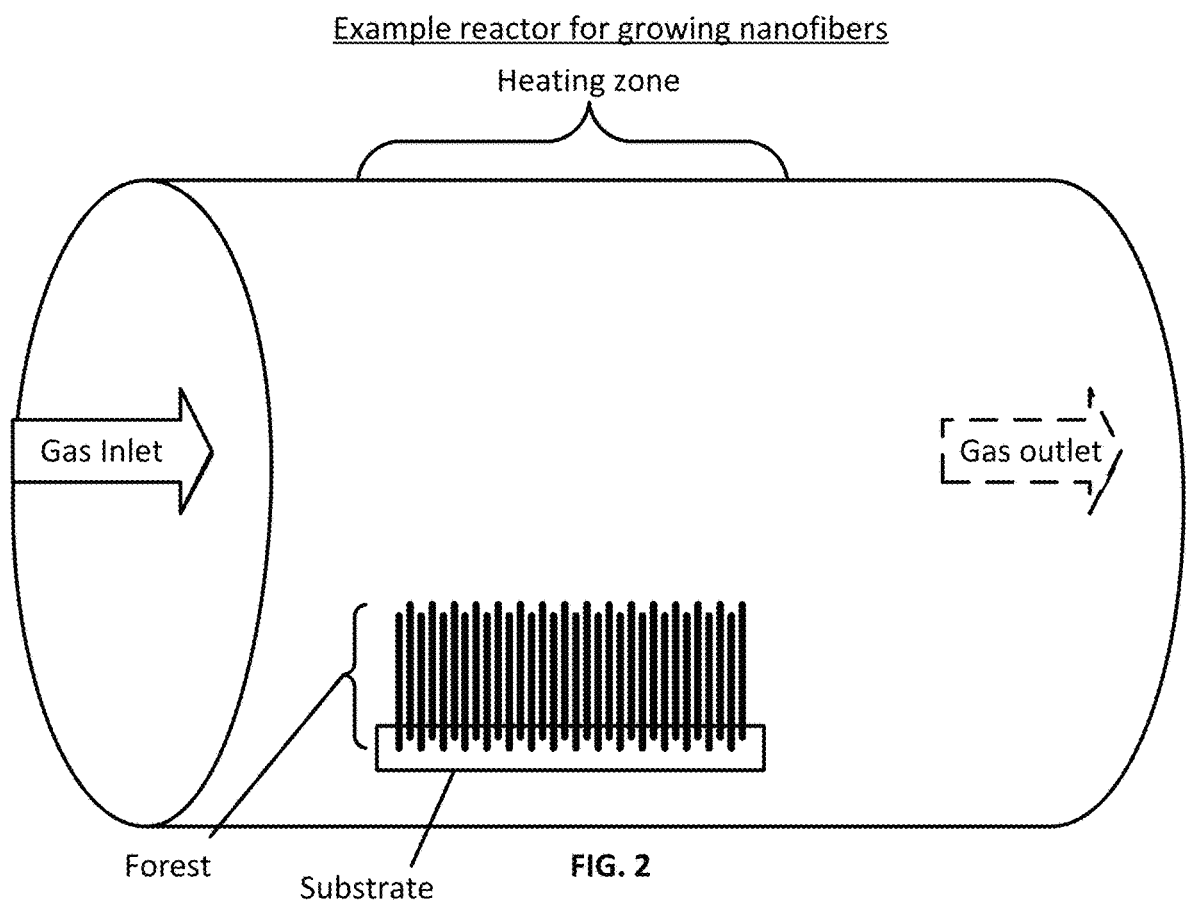
FIG. 2 illustrates an example reactor used for growing nanofibers, in an embodiment.

Various methods can be used to produce nanofiber precursor forests. For example, in some embodiments nanofibers may be grown in a high-temperature furnace, schematically illustrated in FIG. 2. In some embodiments, catalyst may be deposited on a substrate, placed in a reactor and then may be exposed to a fuel compound that is supplied to the reactor. Substrates can withstand temperatures of greater than 800° C. or even 1000° C. and may be inert materials. The substrate may comprise stainless steel or aluminum disposed on an underlying silicon (Si) wafer, although other ceramic substrates may be used in place of the Si wafer (e.g., alumina, zirconia, SiO$_2$, glass ceramics). In examples where the nanofibers of the precursor forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers. The reactor also may include a gas inlet where fuel compound(s) and carrier gasses may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream.

In a process used to fabricate a multilayered nanofiber forest, one nanofiber forest is formed on a substrate followed by the growth of a second nanofiber forest in contact with the first nanofiber forest. Multi-layered nanofiber forests can be formed by numerous suitable methods, such as by forming a first nanofiber forest on the substrate, depositing catalyst on the first nanofiber forest and then introducing additional fuel compound to the reactor to encourage growth of a second nanofiber forest from the catalyst positioned on the first nanofiber forest. Depending on the growth methodology applied, the type of catalyst, and the location of the catalyst, the second nanofiber layer may either grow on top of the first nanofiber layer or, after refreshing the catalyst, for example with hydrogen gas, grow directly on the substrate thus growing under the first nanofiber layer. Regardless, the second nanofiber forest can be aligned approximately end-to-end with the nanofibers of the first nanofiber forest although there is a readily detectable interface between the first and second forest. Multi-layered nanofiber forests may include any number of forests. For example, a multi-layered precursor forest may include two, three, four, five or more forests.

Nanofiber Sheets

Figure 3:
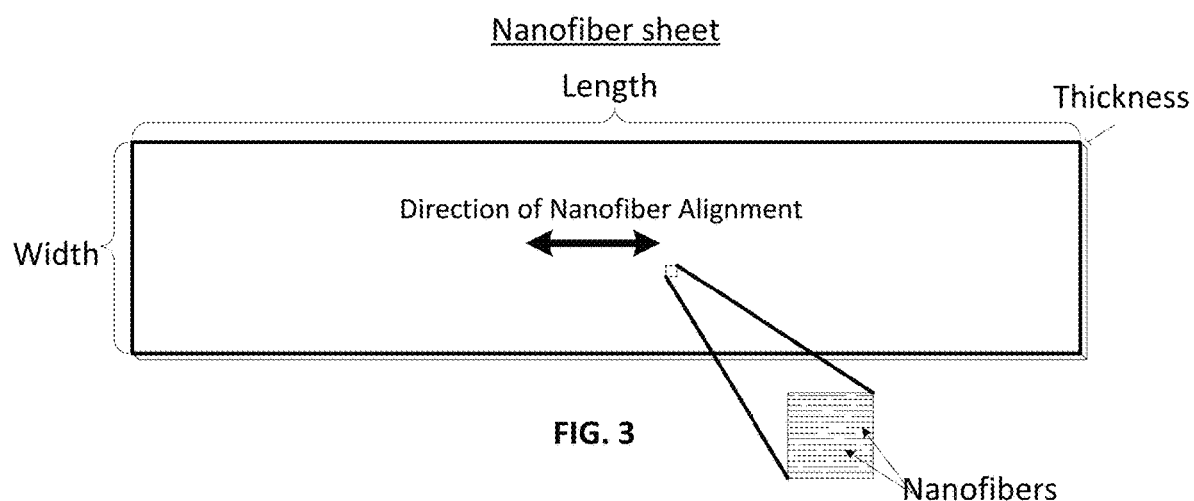
FIG. 3 is an illustration of a nanofiber sheet that identifies relative dimensions of the sheet and schematically illustrates nanofibers within the sheet aligned end-to-end in a plane parallel to a surface of the sheet, in an embodiment.

In addition to arrangement in a forest configuration, the nanofibers of the subject application may also be arranged in a sheet configuration. As used herein, the term "nanofiber sheet," "nanotube sheet," or simply "sheet" refers to an arrangement of nanofibers where the nanofibers are aligned end to end in a plane. An illustration of an example nanofiber sheet is shown in FIG. 3 with labels of the dimensions. In some embodiments, the sheet has a length and/or width that is more than 100 times greater than the thickness of the sheet. In some embodiments, the length, width or both, are more than $10^3$, $10^6$ or $10^9$ times greater than the average thickness of the sheet. A nanofiber sheet can have a thickness of, for example, between approximately 5 nm and 30 μm and any length and width that are suitable for the intended application. In some embodiments, a nanofiber sheet may have a length of between 1 cm and 10 meters and a width between 1 cm and 1 meter. These lengths are provided merely for illustration. The length and width of a nanofiber sheet are constrained by the configuration of the manufacturing equipment and not by the physical or chemical properties of any of the nanotubes, forest, or nanofiber sheet. For example, continuous processes can produce sheets of any length. These sheets can be wound onto a roll as they are produced.

As can be seen in FIG. 3, the axis in which the nanofibers are aligned end-to end is referred to as the direction of nanofiber alignment. In some embodiments, the direction of nanofiber alignment may be continuous throughout an entire nanofiber sheet. Nanofibers are not necessarily perfectly parallel to each other and it is understood that the direction of nanofiber alignment is an average or general measure of the direction of alignment of the nanofibers.

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 4

Figure 4:
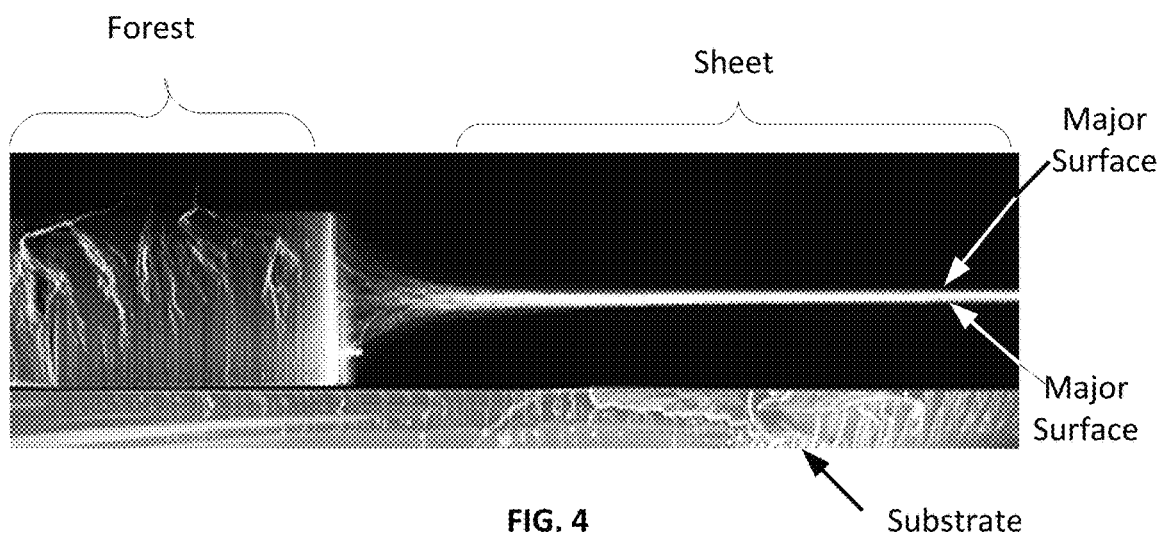
FIG. 4 is an image of a nanofiber sheet being laterally drawn from a nanofiber forest, the nanofibers aligning from end-to-end as schematically shown in FIG. 3.

As can be seen in FIG. 4, the nanofibers may be drawn laterally from the forest and then align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the draw process when the desired sheet length has been achieved.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin. In some examples, a nanofiber sheet is on the order of approximately 10 nm thick (as measured within normal measurement tolerances), rendering it nearly two-dimensional. In other examples, the thickness of a nanofiber sheet can be as high as 200 nm or 300 nm. As such, nanofiber sheets may add minimal additional thickness to a component.

As with nanofiber forests, the nanofibers in a nanofibers sheet may be functionalized by a treatment agent by adding chemical groups or elements to a surface of the nanofibers of the sheet and that provide a different chemical activity than the nanofibers alone. Functionalization of a nanofiber sheet can be performed on previously functionalized nanofibers or can be performed on previously unfunctionalized nanofibers. Functionalization can be performed using any of the techniques described herein including, but not limited to CVD, and various doping techniques.

Nanofiber sheets, as drawn from a nanofiber forest, may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon.

Defects in Nanofiber Sheets

Figure 5A:
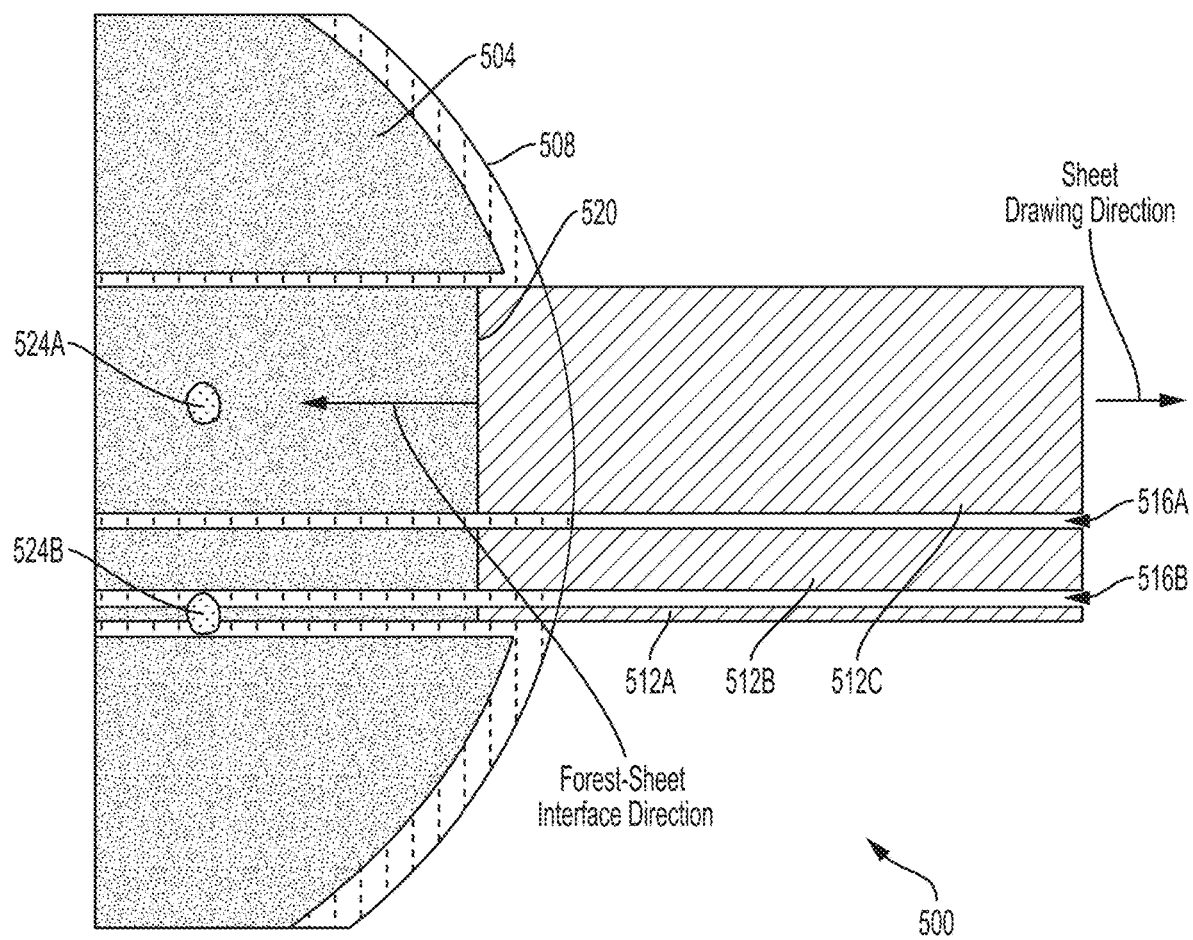
FIGS. 5A to 5C illustrate nanofiber sheets being drawn from a nanofiber forest in which non-spinnable particles that are present cause defects in the nanofiber sheets, in embodiments.
Figure 5B:
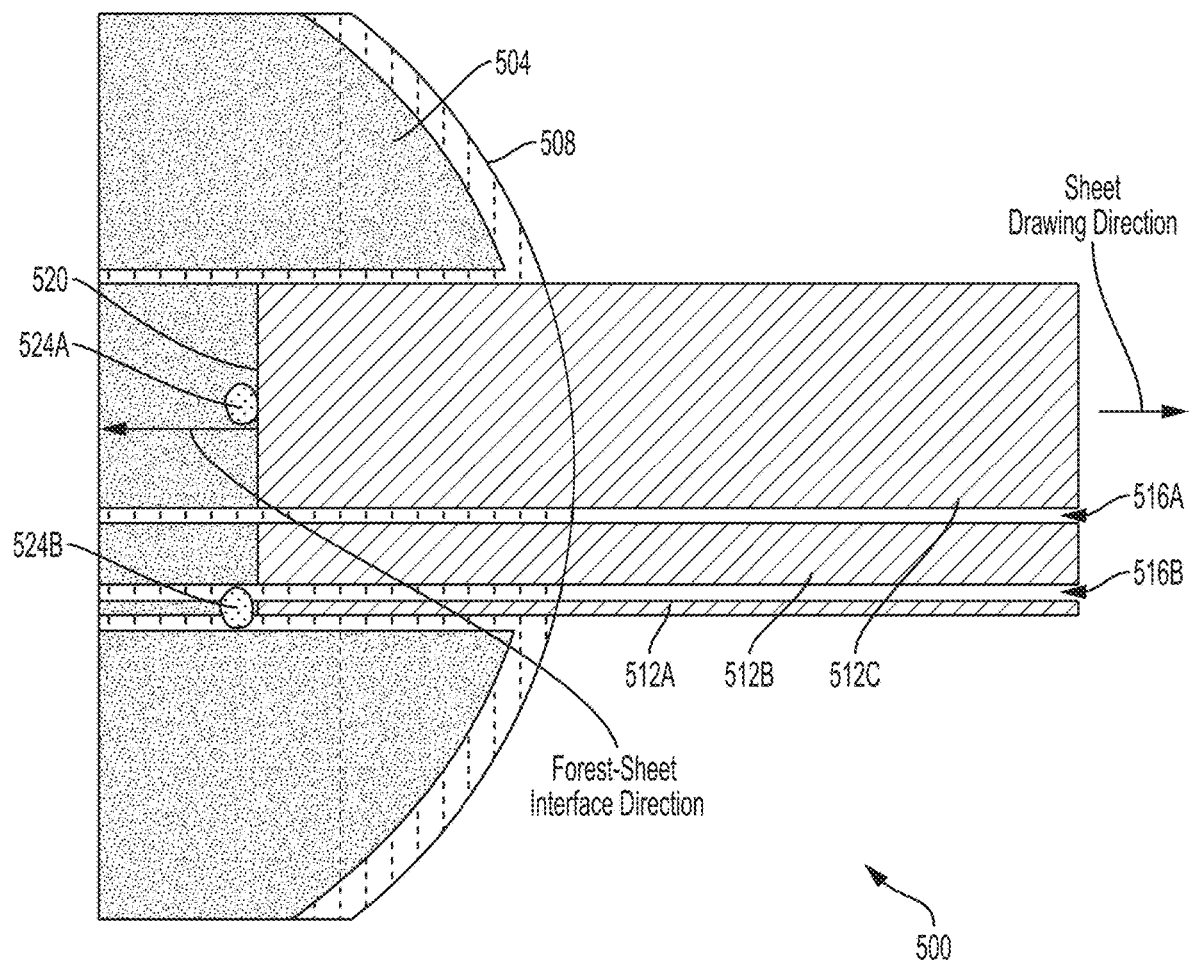
Figure 5C:
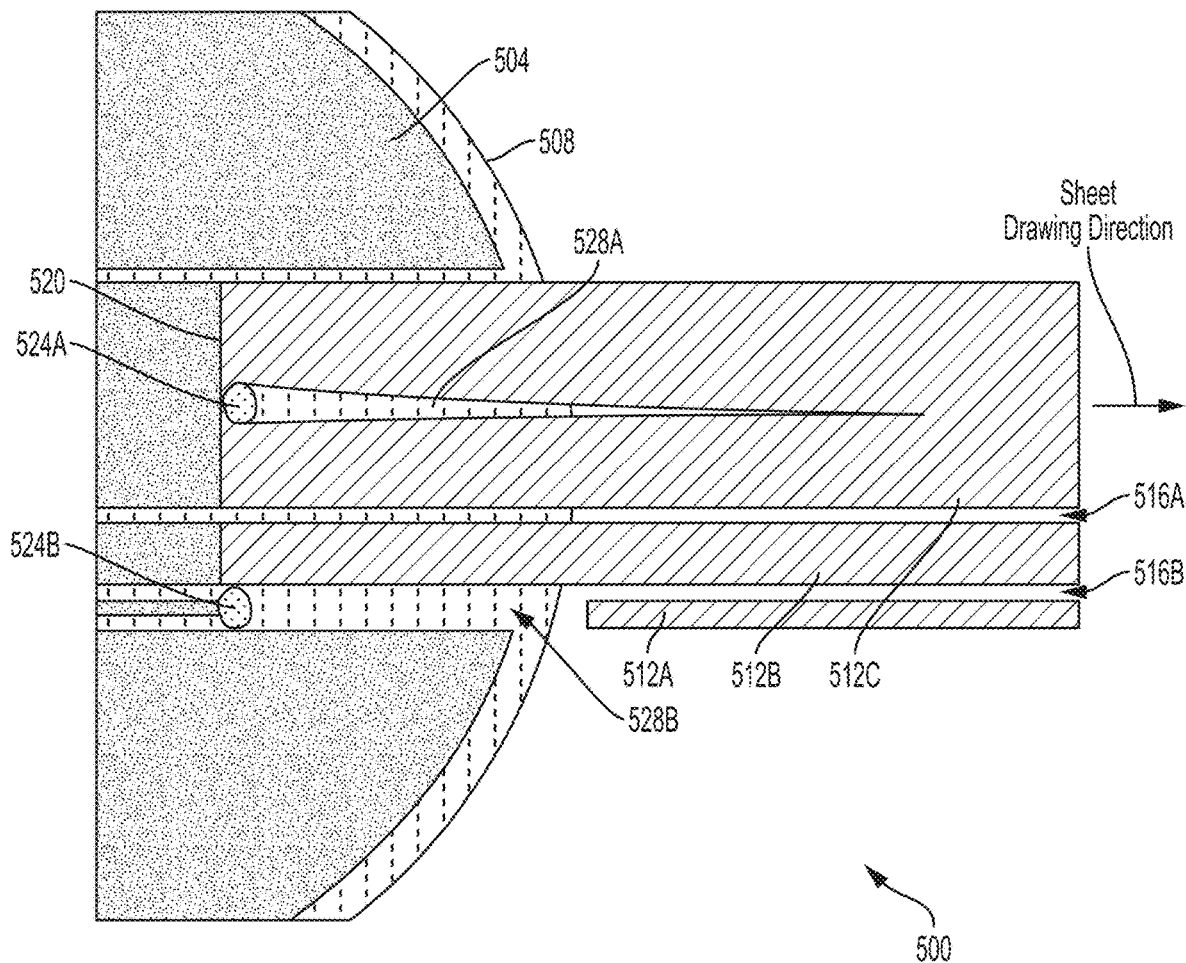

As indicated above, variations in density within a nanofiber sheet or inclusion of non-spinnable particles can be problematic when spinning a nanofiber sheet into a nanofiber yarn. FIGS. 5A-5C illustrate one example of a challenge posed by the inclusion of a non-spinnable particle when drawing a nanofiber forest.

FIG. 5A is a plan view illustration 500 of three nanofiber sheets being drawn from a patterned nanofiber forest disposed on a substrate. While embodiments described herein are applicable to patterned and non-patterned forests, the illustration 500 employs a patterned substrate so as to simultaneously illustrate two different types of defects in nanofiber sheets caused by the presence of non-spinnable particles. Examples of patterned forests and techniques for patterning forests are described in PCT Publication No. WO 2007/015710, which is incorporated by reference herein in its entirety.

The illustration 500 includes a nanofiber forest 504, a growth substrate 508, nanofiber sheets 512A, 512B, and 512C, and particles 524A, 524B.

The nanofiber forest 504 is shown in its as-grown state on the growth substrate 508. The example nanofiber forest 504 and the example growth substrate 508 have been described above and need no further explanation. It will be appreciated that in some examples the substrate 508 may actually be a secondary substrate, such as an adhesive substrate, and the nanofiber forest 504 may have been processed so as to align the nanofibers in a common direction relative to the secondary substrate, such as those described in PCT Application No. PCT/US2017/036687, which is incorporated by reference herein in its entirety.

As shown, the patterned nanofiber forest 504 is drawn into three nanofiber sheets 512A, 512B, 512C. The processes for drawing a nanofiber forest into a nanofiber sheet (or sheets) are described above, and shown in FIGS. 3 and 4. Nanofiber sheets 512A and 512B are separated by a gap 516B. Nanofiber sheets 512B and 512C are separated by a gap 516A.

Both the gaps 516A and 516B can be produced by patterning a substrate or patterning an arrangement of catalyst on the substrate, in examples.

As the nanofiber sheets 512A, 512B, 512C are drawn from the forest 504, a forest-sheet interface 520 gradually moves toward an opposing edge (not shown) of the substrate in a direction opposite the sheet drawing direction. Both the movement of the forest-sheet interface 520 and the sheet drawing direction are indicated by arrows in FIG. 5A.

In the illustration 500, the particles 524A, 524B are disposed within the nanofiber forest 504. In this example, the particles 524A, 524B are not only within the nanofiber forest 504, but also fixed relative to the substrate 508. The effect of the particles 524A, 524B is to disrupt the alignment and ordering of nanofibers within the drawn nanofiber sheet (e.g., any one or more of sheets 512A, 512B, 512C). This disruption can be due to the size and/or shape of the particles 524A, 524B. For example, spherical (or irregular, spheroidal structures) can cause defects that tear a nanofiber sheet as the sheet is being drawn. In another example, large structures, regardless of the shape, can disrupt the organization of a large number of nanofibers. Other mechanisms for causing a defect in a nanofiber sheet will be appreciated in light of the present disclosure.

Particles that can cause a persistent defect within a nanofiber sheet, in examples, can have a least one dimension that is larger than a cross-sectional thickness of the nanofiber forest. Examples of these particles can include foreign objects disposed on the growth substrate or even agglomerations of nanofibers that are not spinnable. For example, some nanofibers may grow in a disordered group (i.e., not grow in a single layer or not grow parallel to one another). The disordered orientation of the individual nanofibers within the group then acts as a particle that can disrupt the drawing of the nanofibers into the nanofiber sheet.

While some nanofiber forests produce sheets that are thick enough and with sufficient density that the defect, often a tear in the sheet, can be healed with sufficient drawing (that is, the nanofiber sheet regains its continuity upon sufficient drawing), other sheets lack this ability to recover. For example, some nanofiber sheets lack enough nanofibers (whether due to low sheet thickness or low density) sufficient to allow the portions of the sheet separated by a tear to re-form. Thus, these sheets cannot "heal" the tear. In other examples, the defect caused by the particle is large enough so that a sheet, regardless of the nanofiber density within the sheet, is unable to re-form. Much like a variation in density of a continuous nanofiber sheet, the variation caused by a discontinuity (e.g., a tear) in a nanofiber sheet causes variation in the diameter and/or properties of a nanofiber yarn.

FIG. 5B continues the example of illustration 500, in which the nanofiber sheets 512A, 512B, 512C have been drawn to consume more of the nanofiber forest 504, thus moving the forest-sheet interface 520 in the direction indicated and opposite the direction in which the sheets 512A, 512B, 512C are drawn. As shown, the forest-sheet interface 520 is adjacent to the particles 524A, 524B. However, the forest has not yet been drawn past the particles 524A, 524B.

FIG. 5C illustrates two different types of defects caused by the particles 524A, 524B. In this example, the forest-sheet interface 520 has moved past the particles 524A, 524B in a direction opposite the direction in which the nanofiber sheets 512A, 512B, 512C are drawn. As such, the particle 524A causes a tear 528A to form in the nanofiber sheet 512C. The particle 524B causes the sheet 512A to break entirely (indicated by arrow 528B). These defects are consistent with those described above. For example, particle 524A is either large enough, shaped irregularly enough, or both, to cause a tear in the nanofiber sheet 512C. At the same time, the nanofiber sheet 512C is dense enough, wide enough, or both, that the nanofiber sheet 512C can re-form, thus "healing" some of the tear 528A.

The nanofiber sheet 512A however lacks the capability of the nanofiber sheet 512C. As is shown in FIG. 5C, a width of the nanofiber sheet 512A is less than a corresponding dimension of the irregularly shaped particle 524B. For this reason, when the portion of the forest-sheet interface 520 corresponding to the nanofiber sheet 512A encounters the particle 524B, the nanofiber sheet 512A breaks. The discontinuity between the nanofiber sheet 512A and its corresponding portion of nanofiber forest on an opposite side of the particle 524B is indicated as discontinuity 528B.

As described above, both the fracture of a nanofiber sheet (e.g., nanofiber sheet 512A) and formation of a tear in a nanofiber sheet (e.g., nanofiber sheet 512C), among other defects not described but apparent to those skilled in the art, affect the consistency of nanofiber yarns spun from the nanofiber forest.

Controlling Nanofiber Sheet Width

To overcome the challenges posed by inhomogeneities in nanofiber forests and nanofiber sheets, including those described above, embodiments described herein include various mechanisms for dividing a nanofiber sheet in its as-drawn form into any number of sub-sheets. In examples, the embodiments described herein can be used to maintain a uniform density of nanofibers within a sub-sheet, confine a defect to within one sub-sheet so that the remaining sub-sheets can maintain a level of homogeneity that can produce a consistent nanofiber yarn (e.g. having a consistent and uniform diameter (+/−5% from a mean value as measured along a length of the yarn) and/or electrical properties), among other embodiments. In some examples, systems used to divide a nanofiber sheet into sub-sheets can be selectively configured so that any number of nanofiber sub-sheets of any width can be fabricated.

Techniques of the present disclosure for dividing a nanofiber sheet include both electrical and mechanical techniques. Electrical techniques include using electrical current (whether alternating current AC or direct current DC) between an electrode and the nanofiber sheet. Mechanical techniques include a razor blade configured to include salient and reverse salient portions.

Figure 6A:
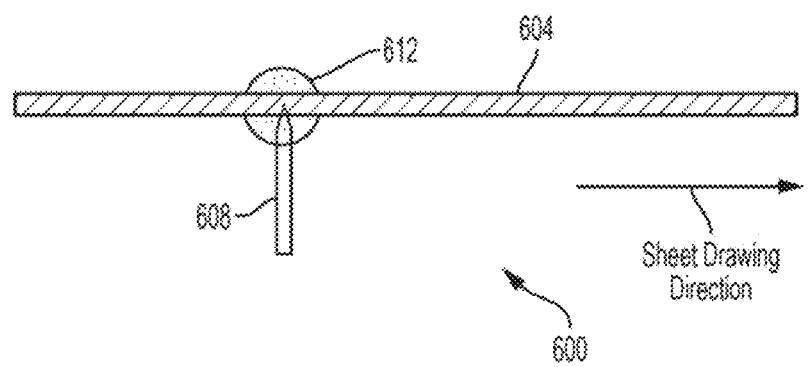
FIG. 6A illustrates a one-electrode electrical discharge system for dividing a nanofiber sheet into sub-sheets using a contactless dividing technique, in an embodiment.
Figure 6B:
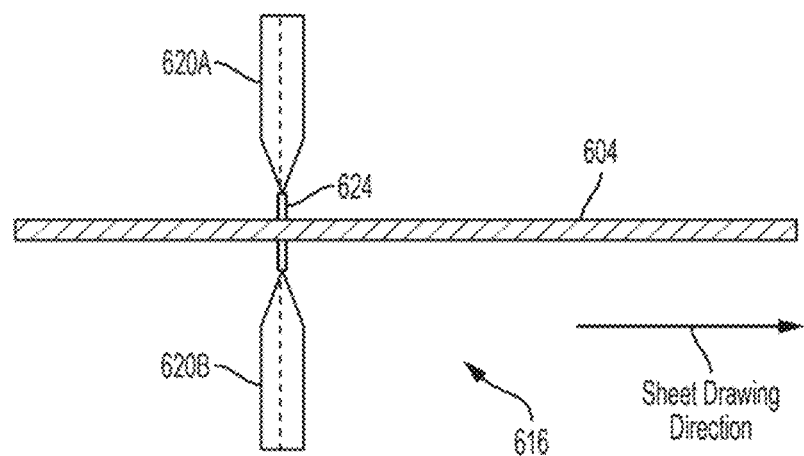
FIG. 6B illustrates a two-electrode electrical discharge system for dividing a nanofiber sheet into sub-sheets using a contactless dividing technique, in an embodiment.

FIGS. 6A and 6B illustrate system configurations using two different types of electrical discharge techniques in embodiments.

FIG. 6A schematically illustrates a single electrode system 600 for controlling a nanofiber sheet width using a corona or an arc generated at a single electrode. In this example, the system 600 includes an electrode 608 and, not shown, a power source connected to the electrode 608. The nanofiber sheet 604 is shown in FIG. 6A to provide context for the system 600. Electrical discharge 612 (whether the charged particles of a corona or an arc between the electrode 608 and the nanofiber sheet 604) is schematically illustrated emanating from the electrode 608. As indicated above and as illustrated in FIG. 6A, the electrode 608 does not contact the nanofiber sheet 604. Rather, electrical discharge 612 (whether a corona or an electrical arc) bridges a gap between the electrode 608 and the nanofiber sheet 604, removing a portion of the nanofiber sheet 604 and thus dividing the nanofiber sheet 604 into sub-sheets.

The electrode 608 is connected to an electricity source and an electrical controller (not shown). In one example, the electrode 608 is fabricated from a good electrical conductor having an electrical conductivity greater than 3×10⁷ Siemens/meter at 20° C., such as gold, copper, aluminum, among others. In another example, the electrode 608 is fabricated from tungsten. In some embodiments, the electrode is shaped with a pointed tip. A pointed shape facilitates a high gradient in the electric field generated at the electrode 608 relative to the surrounding air. This in turn facilitates formation of a corona around the pointed tip of the electrode or an electrical arc between the electrode 608 and the nanofiber sheet 604 depending on the current, voltage, and a composition of an ambient atmosphere. It will be appreciated that a pointed tip is not required. In the example system 600, the electrical controller connected to the electrode 608 can be any controller capable of producing a low current, high voltage condition associated with the electrode 608. Example currents can be within any of the following ranges: 0.1 milliAmp (mA) to 1 mA; 1 mA to 5 mA; 1 to 2 mA; to 0.5 mA to 1 mA. Example voltages can be within any of the following ranges: 50 Volts (V) to 220 V; 50 V to 110 V; 50 V to 75 V; 75 V to 110 V. As indicated above, regardless of the value, the current and voltage supplied to the electrode is consistent (e.g., within +/−5%) during the dividing of the nanofiber sheet 604 into sub-sheets. Consistent current and voltage improves consistency of the width of material removed, which would otherwise vary widely if the current and/or voltage increased dramatically (or "spiked") during processing. It will be appreciated that any variety of combinations of current and voltage, even those not listed above, can be applied in accordance with the present disclosure and that the preceding examples are provided for illustration only.

One example type of a control system that can be used to provide electrical current to the electrode 608 so that the electrode generates a corona or an electrical arc is that of an electrical discharge machining system (EDM) controller. Another example type of control system is a pulse width modulation (PWM) controller. In some examples, the controller is used to maintain a consistent application of current and/or voltage to the electrode 608. Generally, whether an EDM controller or some other electrical controller is used to supply current to the electrode 608, the electrical current and voltage supplied to the electrode 608 are sufficient to form an electrical discharge 612 around the electrode 608 consistent with the supplied voltage and current. As a result of the electric field gradient around the electrode 608, atoms and/or molecules are removed from the nanofiber sheet 604 by the resulting electrical discharge, thus dividing the nanofiber sheet 604 into sub-sheets, as described herein.

As shown, the nanofiber sheet 604 is disposed proximate to the electrode 608. The electrode 608 is energized and the nanofiber sheet 604 is drawn so that atoms and/or molecules are removed from a portion of the nanofiber sheet 604 proximate to the electrode 608. In this way, the electrode 608 (or multiple electrodes 608) can be used to divide the nanofiber sheet 604 into one or more sub-sheets, whether to confine a defect to a sub-sheet or to control the width of the sub-sheets for some other reason (e.g., to ultimately control diameter and variation in diameter of a nanofiber yarn fabricated from a sub-sheet). The nanofiber sheet 604 is connected to an electrically grounded structure, whether a grounded growth substrate, yarn spinning assembly, or a bobbin used to collect a nanofiber sub-sheet and/or spun nanofiber yarn.

In an example, a voltage between the electrode 608 and the nanofiber sheet 604 can be increased to increase a dimension of the corona and/or electric arc and thus increase a dimension of the corresponding portion of nanofibers removed from the nanofiber sheet 604. In other words, by increasing this voltage, a gap between adjacent sub-sheets created from the nanofiber sheet 604 can be increased. In examples, this effect can be used to control the width of a sub-sheet. In some examples, a 1 mA current was applied to two electrodes 608 (spaced 1 millimeter (mm) apart) and the voltage was selectively varied to vary a width of the sub-sheet between the two electrodes 608. At 1 mA and 70 V applied to the two electrodes 608, the sub-sheet between the electrodes had a width of 900 microns (μm). At 1 mA and 80 V applied to the two electrodes 608, the sub-sheet between the electrodes had a width of 750 μm. At 1 mA and 95 V applied to the two electrodes 608, the sub-sheet between the electrodes had a width of 500 μm. In embodiments, the voltage and current can be adjusted to produce sub-sheets as narrow as 5 μm. This control allows for a feedback mechanism to take in-line yarn diameter measurements and actively control the diameter of the CNT ribbons being spun into yarns. Adjusting a width of a nanofiber sub-sheet by adjusting electrode voltage is described below in more detail in the context of FIG. 8.

In one example, a feedback system can measure yarn diameter directly or indirectly as the yarn exits a yarn spinner, and adjust a current and/or voltage supplied to an electrode(s) (or even adjust a location of the electrode relative to the sheet) to increase or decrease a width of the sub-sheet entering the yarn spinner. This adjustment can, in an example, help maintain a diameter of the nanofiber yarn being spun. In other examples, this feedback mechanism can be used to intentionally increase or decrease a diameter of a portion of a nanofiber yarn relative to a previously spun (or subsequently) spun portion of the nanofiber yarn. Examples of yarn diameter measurement system that can measure yarn diameter in situ include optical systems, such as a laser micrometer, and electrical systems (monitoring a conductance or resistance by placing one or more probes in electrical contact with a segment of nanofiber yarn), among others. For example, a density of a nanofiber sub-sheet can decrease from a first value to a lower second value (due to a tear defect or merely a low density of nanofibers within a corresponding area of the nanofiber forest). This can cause a diameter of nanofiber yarn spun from the nanofiber sheet to decrease from a first diameter to a smaller second diameter. To reduce the diameter variability (and variability in properties), at least one of a corona size and an electrode location can be adjusted to increase the width of the nanofiber sub-sheet. By increasing the width of the sub-sheet, the quantity of nanofibers is increased so as to offset the decrease in nanofiber density within the sub-sheet. This can restore the diameter of the nanofiber yarn to the first diameter, thus reducing diameter variability and property variability within the nanofiber yarn. The responsiveness of the system can reduce nanofiber yarn variation to less than +/−5% over sections as short as 1 mm. It will be appreciated that this type of feedback system is applicable to any of the embodiments described herein.

By way of illustration, in one example a nanofiber yarn diameter D can be estimated and/or calculated according to Equation 1, where D is in centimeters (cm) W is nanofiber sheet width (cm), SD is nanofiber sheet areal density (grams/cm²), and ρ is nanofiber yarn density (g/cm³).

$$D = \{4 * W * ((SD/\pi)/\rho)\}^{1/2} \qquad \text{Equation 1}$$

In examples, sheet areal density can be between $0.5 \times 10^{-6}$ to $10 \times 10^{-6}$ g/cm² and yarn density (for yarns not including particles or infiltrated materials) can be from 0.1 to 1.6 g/cm³. In one specific example embodiment, a sheet selected to have a width of 20 mm and a sheet areal density of $2.8 \times 10^{-6}$ g/cm$^2$ can produce a yarn having a density of 1.0 g/cm$^3$. A calculated diameter of this yarn is 26.7 microns (μm). It will be appreciated that as the areal density of the sheet or the density of the yarn changes (as can be detected in situ during production), embodiments of the present disclosure can be used to adjust the sheet width to a value other than 20 mm so as to maintain a yarn diameter of 26.7 μm or otherwise minimize the portion of yarn that deviates from a diameter of 26.7 μm. In an analogous example, a sheet selected to have a width of 1.1 mm and a sheet areal density of $2.4 \times 10^{-6}$ g/cm$^2$ can produce a yarn having a density of 0.9 g/cm$^3$. A calculated diameter of this yarn is 6.1 microns (μm). As with the preceding example, embodiments of the present disclosure can be used to maintain the diameter of the yarn during yarn production.

FIG. 6B illustrates a two-electrode arc discharge system 616 for dividing a nanofiber sheet 604 into sub-sheets. In this example, electrodes 620A and 620B are placed on opposite major surfaces of the nanofiber sheet 604. The electrical arc 624 between the electrode 620A and the electrode 620B removes material from the nanofiber sheet 604. That is, when the nanofiber sheet 604 is drawn through the arc 624 (and not in direct physical contact with electrodes 620A, 620B), the arc 624 removes a portion of the nanofiber sheet 604, thereby dividing the nanofiber sheet 604 into sub-sheets, as described above. An advantage of the arc discharge system 616 is that the removal of the portion of the nanofiber sheet 604, and the size of the portion removed, is independent of the electrical conductivity of the nanofiber sheet 604. In other words, the electrical arc 624 forms between electrodes 620A and 620B, the size of which is not influenced by the electrical properties of the nanofiber sheet.

Figure 7A:
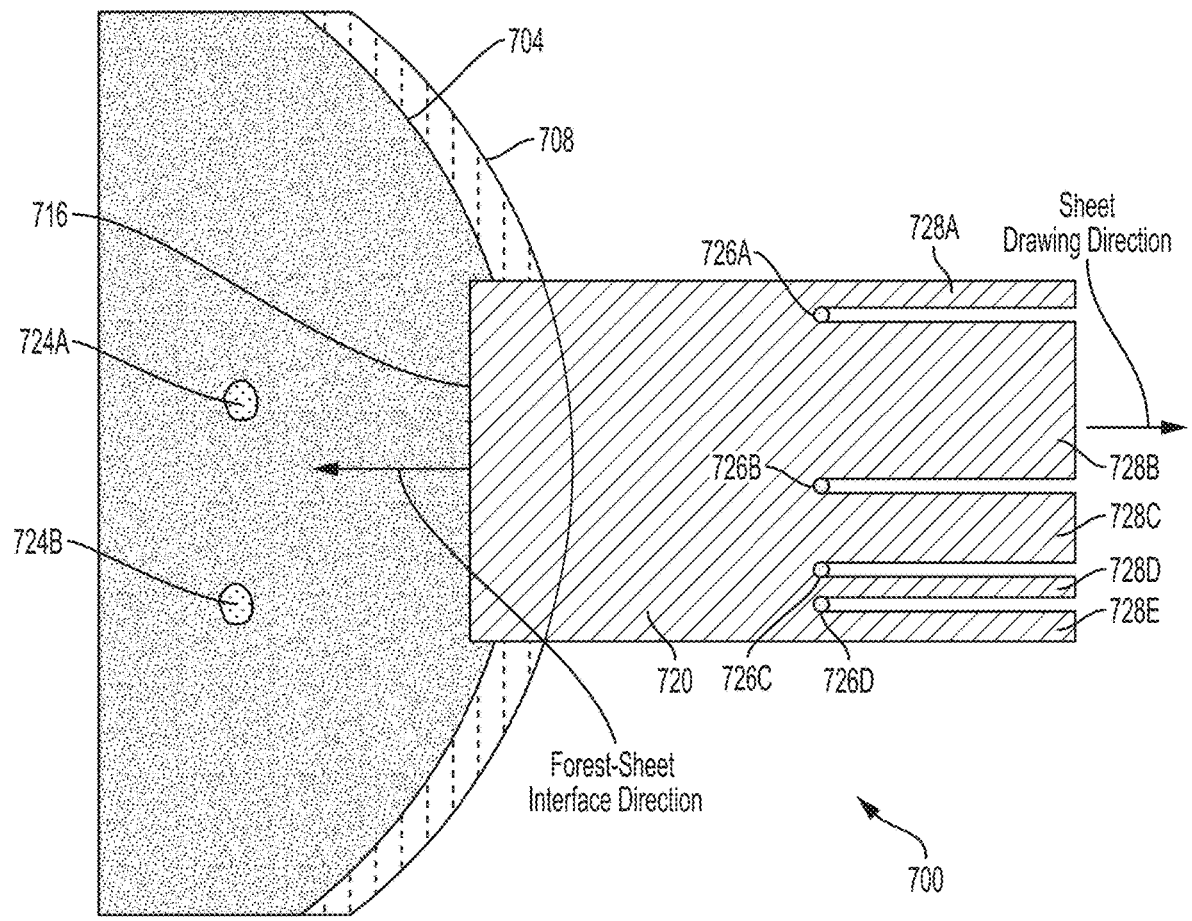
FIGS. 7A and 7B illustrate plan views of a corona discharge system dividing a nanofiber sheet into sub-sheets, without physical contact between an electrode and the nanofiber sheet, in an embodiment.
Figure 7B:
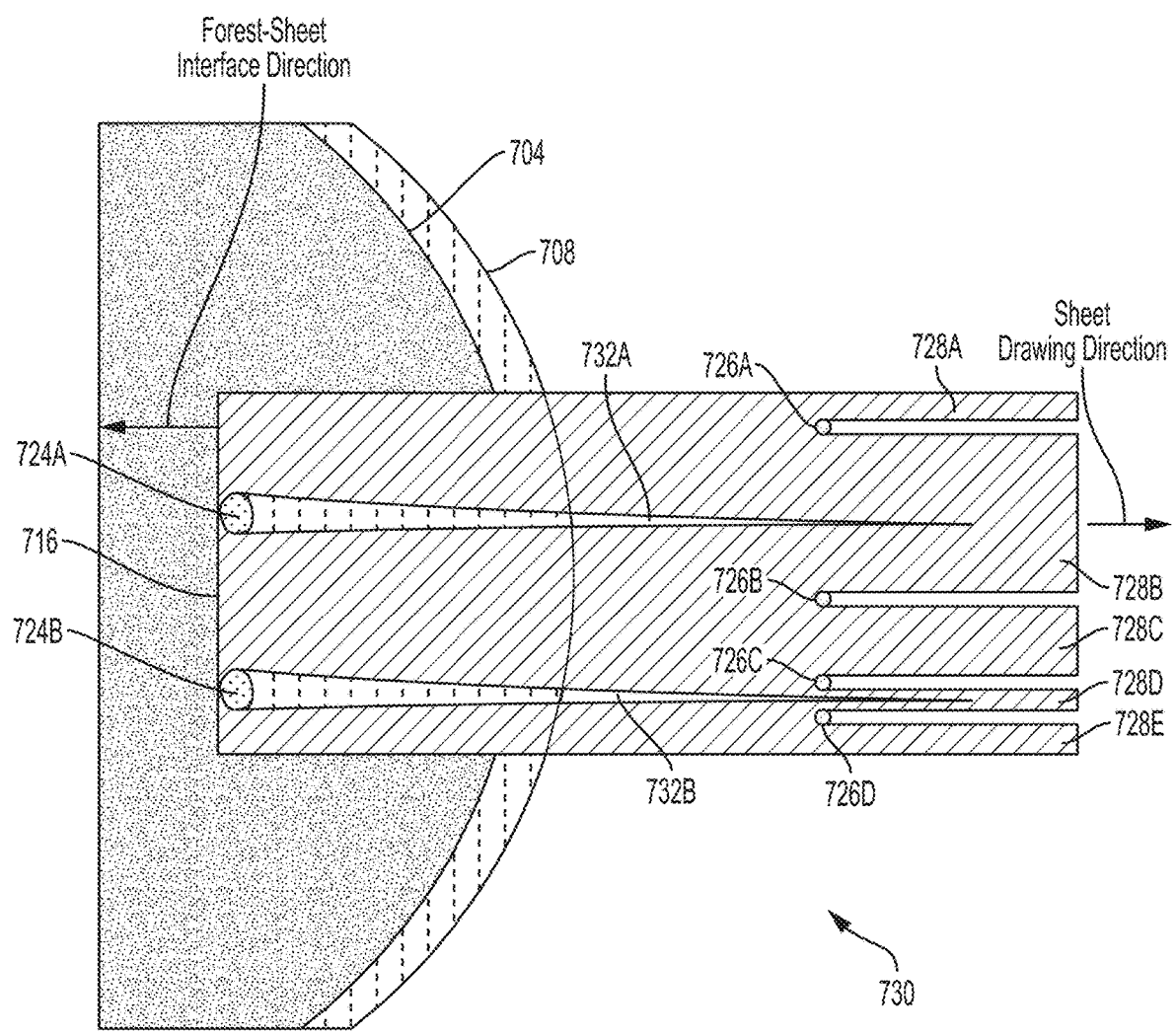

FIGS. 7A and 7B illustrate plan views of the system 600 used to divide a nanofiber sheet into sub-sheets, in an embodiment. As shown in FIG. 7A, the view 700 includes a nanofiber forest 704, a substrate 708, and a nanofiber sheet 720.

The nanofiber forest 704 and the substrate 708 have been described above and needs no further description. As shown, the nanofiber sheet 720 is drawn from the nanofiber forest 704. A forest-sheet interface 716 moves in a direction opposite that of the direction in which the nanofiber sheet 720 is drawn. Both of these directions are indicated in FIG. 7A.

As the nanofiber sheet 720 is drawn from the forest 704, the forest-sheet interface 716 moves toward defects 724A, 724B. The defects 724A, 724B, and the potential effects on the integrity, consistency, density, and properties of the nanofiber sheet 720 have been described above and need no further description.

The view 700 also depicts coronas 726A, 726B, 726C, and 726D that correspond to electrodes (not shown). It will be appreciated that in other embodiments, a one or two electrode arc discharge system and method can be applied. Regardless of whether a corona or an electrical arc is used, and regardless of whether one or two electrodes are used, the electrical discharge removes material of the nanofiber sheet 720, thus diving the nanofiber sheet 720 into nanofiber sub-sheets 728A, 728B, 728C, 728D, and 728E.

Continuing with the scenario depicted in FIG. 7A, the view 730 in FIG. 7B shows a state in which the nanofiber sheet 720 has been drawn so that the forest-sheet interface has progressed so as to pass beyond the defects 724A and 724B, thus introducing defects 732A and 732B into the nanofiber sheet 720. However, in an embodiment of the present disclosure, the defects 732A and 732B are confined to sub-sheets 728B and 728D due to the dividing of the nanofiber sheet 720 into sub-sheets, as described above. In this way, sub-sheets 728A, 728C, and 728E have an improved consistency and uniformity, being free from defects. As described above, the defect-free and more consistent sub-sheets 728A, 728C, and 728E can be used to produce one or more nanofiber yarns that have a more uniform or consistent diameter (varying less than +/−5% over a 10 meter length of yarn), density (varying less than +/−5% over a 10 meter length of yarn), and properties. These benefits are achieved whether the individual sub-sheets 728A, 728C, and 728E are used to produce corresponding separate nanofiber yarns or whether all of the sub-sheets 728A, 728C, and 728E are used to produce a single nanofiber yarn.

It will also be appreciated that locations of the electrodes 726A-726D (whether used to produce a corona or an electric arc) and the locations of their corresponding electrical discharges (coronas in this case) relative to each other and relative to the nanofiber sheet can be changed. In one example, the size of an arc or corona can be increased or decreased by increasing or decreasing, respectively, a gradient of an electric field generated by the electrode and/or a potential difference between electrodes, as described above. In another example, a mechanical system can be used to physically move one or more of electrodes 726A-726D. Regardless of the method used, changing a size and/or a location of individual electrodes and their corresponding corona and/or arc enables widths of one or more sub-sheets to be controlled. This control can be used to minimize a width of a sub-sheet that contains a defect, thus minimizing the loss of material associated with removing a defect. This control can also be used to maintain a mass of a sub-sheet being spun even as a density of the sub-sheet varies. Examples of control and feedback systems described above include laser micrometers, resistance/conductivity sensors, among others. Thus, even if the sub-sheet itself has a varying density of nanofibers per unit volume, the width of the nanofiber sub-sheet can be varied so that a corresponding nanofiber yarn spun from the sub-sheet is more consistent (e.g., in density, diameter, or in its properties).

Figure 8:
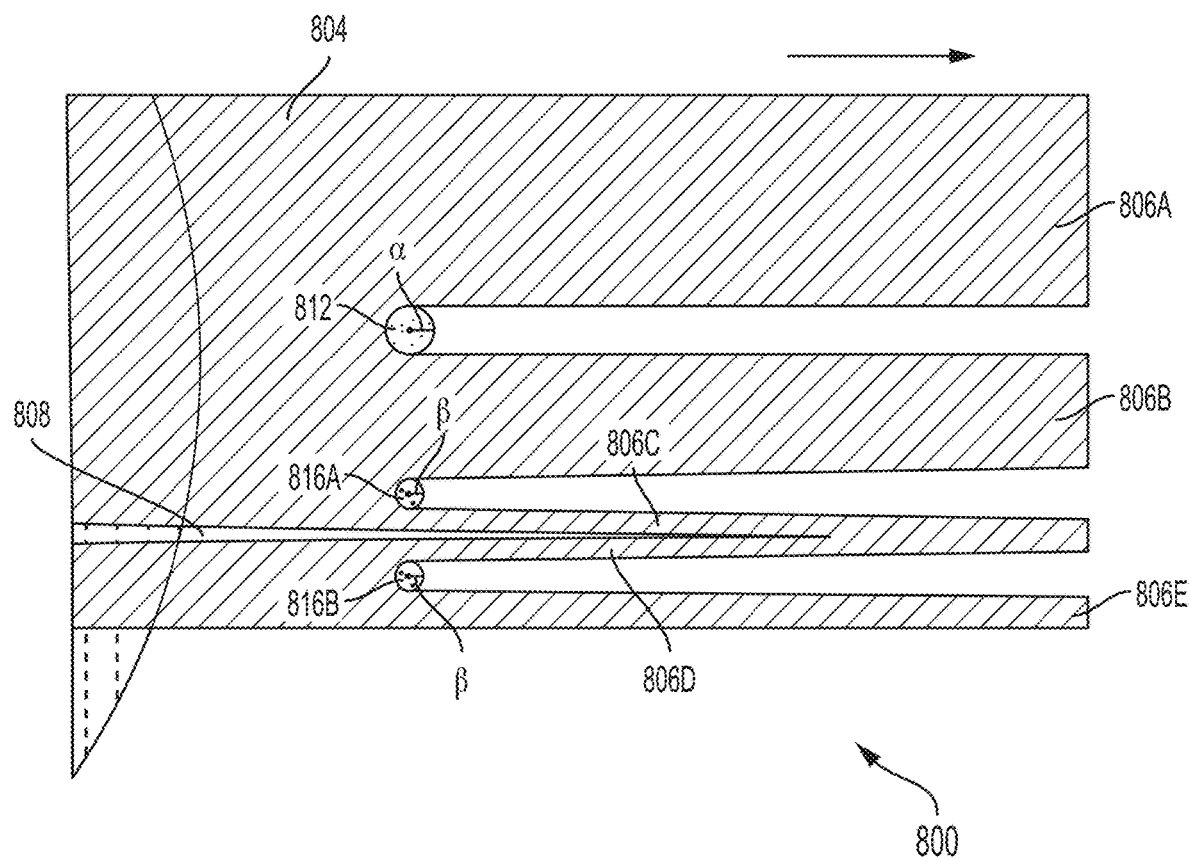
FIG. 8 illustrates altering sizes of electrical discharges to control sub-sheet width, in an embodiment.

FIG. 8 illustrates an embodiment in which sizes of a various electrical discharges are individually selected so as to show an application of this parameter as used to control sub-sheet width around a defect, in an embodiment. The plan view 800 in FIG. 8 includes a nanofiber sheet 804, sub-sheets 806A, 806B, 806C, 806D, and 806E, a tear defect 808, and electrical discharges 812, 816A, and 816B associated with corresponding electrodes. As shown, a radius a of electrical discharge 812 is significantly greater than a radius of either of the electrical discharges 816A or 816B.

Furthermore, electrical discharge size and electrode location can be used in cooperation with a defect, such as tear 808, to control sub-sheet size. In the example shown, the electrodes corresponding to electrical discharges 816A and 816B have been positioned approximately equal distances from corresponding edges of the tear 808. In cooperation with the tear 808, these electrical discharges 816A and 816B divide sub-sheets 806C and 806D from the nanofiber sheet 804, thus taking advantage of the presence of the tear 808 to create new sub-sheets. The electrical discharges 816A and 816B can be sized (using, e.g., voltage and/or current supplied to the electrode) to fine tune a width of a sub-sheet.

Figures 9A, 9B:
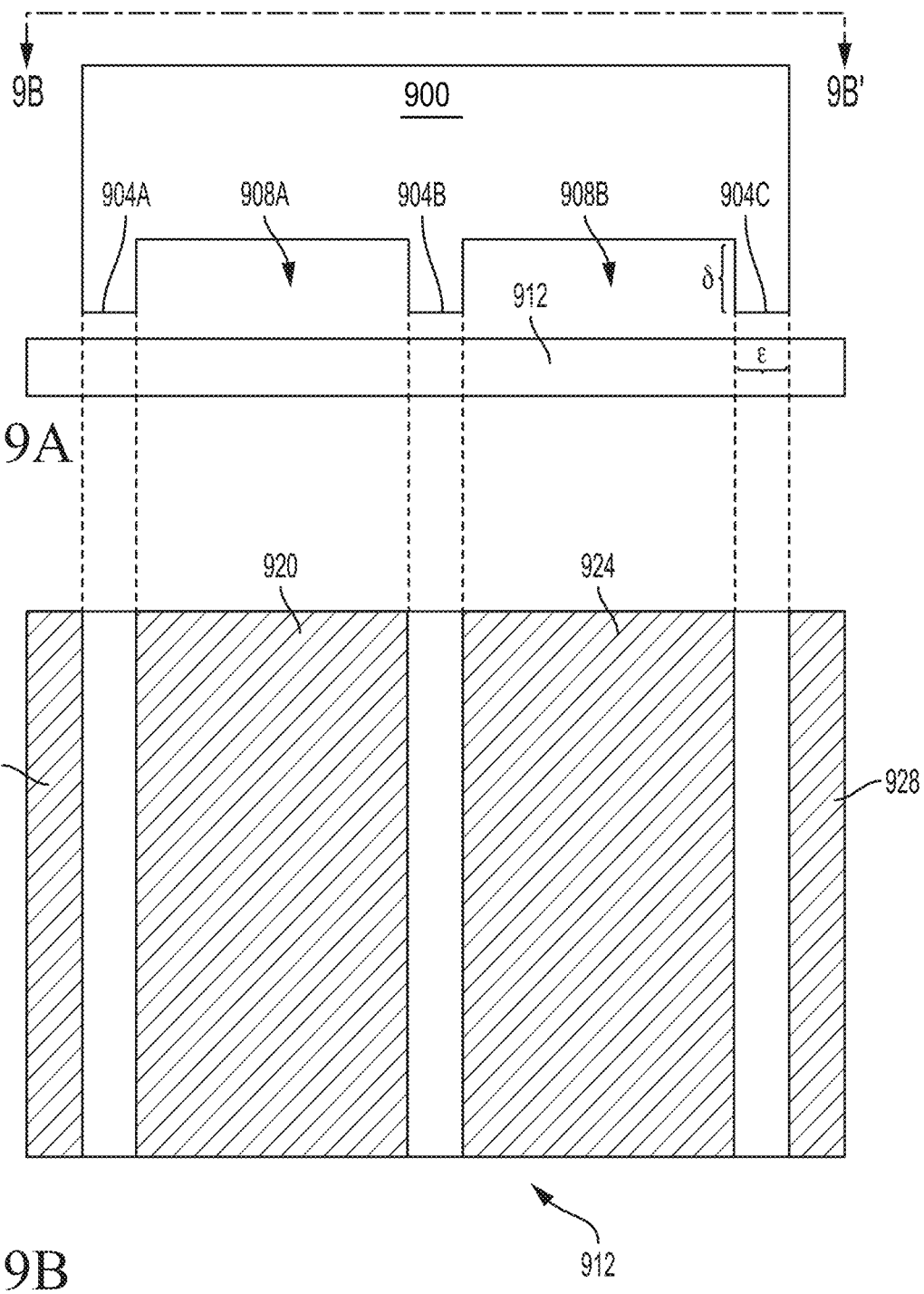
FIGS. 9A and 9B are a side view and a plan view, respectively, of a mechanical system for dividing a nanofiber sheet into sub-sheets, in an embodiment.

FIGS. 9A and 9B illustrate a mechanical method for sub-dividing a nanofiber sheet 912 into sub-sheets 916, 920, 924, and 928. In this example, a mechanical technique is used rather than the electrical techniques described above. In this example, a commercially available razor blade, surgical blade, knife, or other similar blade is machined to include at least one salient feature and at least one reverse salient feature. In the example shown in FIG. 9A, a blade 900 is machined to include salient features 904A, 904B, and 904C, which are separated by reverse salient features 908A and 908B. These features can be machined using stamping, machine tools, EDM, among other techniques. A height δ of the salient feature 904C (equally applicable to salient features 904A and 904B) indicated in FIG. 9A can be any value greater than a thickness of a nanofiber sheet. Example dimensions of the height δ are greater than 1 μm, greater than 20 μm, greater than 50 μm, or even greater than 1 mm. A width ε of the salient feature 904C (equally applicable to salient features 904A and 904B) indicated in FIG. 9A can be any value, from one micron to any value as wide as the nanofiber sheet to be divided. The narrower the salient feature, the more likely the nanofiber sheet is to be divided without loss of material. This conserves nanofiber sheet material that can then be spun into a nanofiber yarn, or otherwise used. Using the dividing device and method of FIG. 9 however, does not have the flexibility of the systems described above in the context of FIGS. 7 and 8 because the separation between salient features in the blade 900 is fixed.

FIG. 9B illustrates the effect on the nanofiber sheet 912 of the blade 900. As shown in the plan view of FIG. 9B, the nanofiber sheet 912 has been divided into sub-sheets 916, 920, 924, and 928, each of which corresponds to a reverse salient feature 908A, 908B or an area of the nanofiber sheet 912 not contacted by a salient features 904A, 904B, 904C. Dividing the sub-sheets 916, 920, 924, and 928 occurs by contacting the nanofiber sheet 912 with the blade edges of the salient features 904A, 904B, 904C and drawing the nanofiber sheet 912 past the salient features while maintain contact there between.

The above embodiments have a number of advantages, in addition to removal of defects from a nanofiber sheet and the production of more consistent nanofiber yarns, as described above. For example, the embodiment described above can be applied to the production of nanofiber yarns that are less than 1 μm in diameter by sub-dividing a nanofiber sheet into sub-sheets that are from 3 μm to 7 μm wide. In some examples, the sub-sheets have a width of 5 μm. Because nanofiber sheets are delicate, sub-dividing nanofiber sheets into micron-scale sub-sheets is difficult using conventional means.

Another advantage of embodiments described above is the capability to simultaneously produce multiple nanofiber yarns. The nanofiber yarns produced, even sub-micron nanofiber yarns, can be of the same or different diameters. This can be accomplished by merely applying one or more embodiments described above and spinning each of the resulting sub-sheets.

Figure 10:
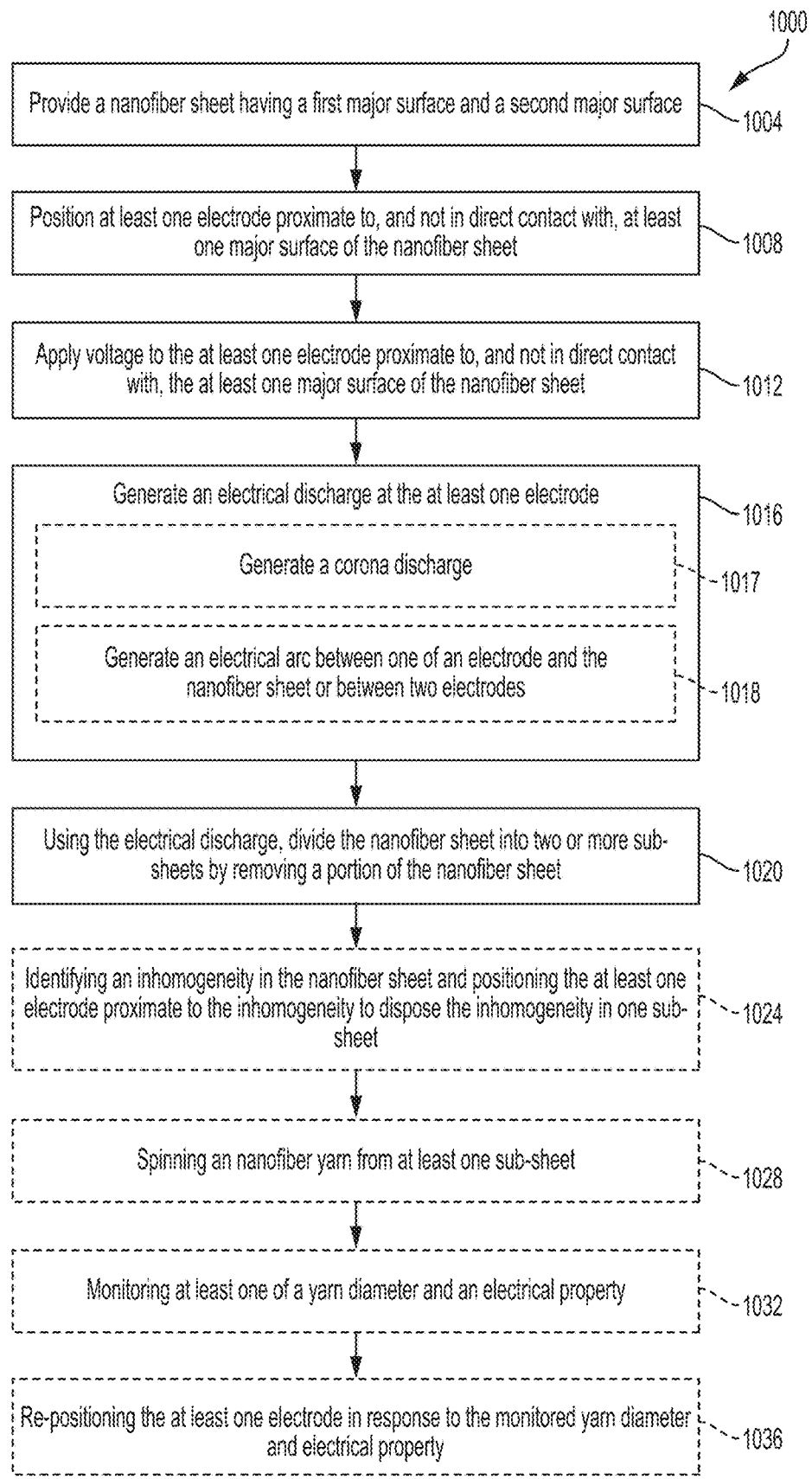
FIG. 10 is a method flow diagram of an example method for dividing a nanofiber sheet into at least two sub-sheets, in an embodiment.

FIG. 10 illustrates an example method 1000 for using at least one electrode to modify a width of a nanofiber sheet, which in some examples is used to control uniformity of a property in a nanofiber yarn spun from the nanofiber sheet, as indicated above.

The method 1000 begins by providing 1004 a nanofiber sheet having a first major surface and the second major surface. At least one electrode is positioned 1008 proximate to, and not in direct contact with, at least one major surface of the nanofiber sheet. A voltage is applied 1012 at the least one electrode. In response to the applied 1012 voltage, an electrical discharge is generated 1016 at the at least one electrode. In some examples as described above, the applied 1012 voltage generates 1017 a corona discharge. In some examples as described above, the applied 1012 voltage generates 1018 an electrical arc. The electrical arc can be between an electrode and the nanofiber sheet or between two electrodes positioned on opposite major surfaces of the nanofiber sheet and traveling through the nanofiber sheet. Regardless, the electrical discharge divides 1020 the nanofiber sheet into two or more sub-sheets by removing a portion of the nanofiber sheet.

Optionally, an inhomogeneity can be identified 1024 in the nanofiber sheet and the at least one electrode can be positioned proximate to the inhomogeneity so as to remove or exclude it from another portion of the nanofiber sheet. In some examples, a nanofiber yarn may optionally be spun 1028 from one of the sub-sheets. A yarn diameter or electrical properties of the nanofiber yarn may be monitored 1032. In response to the monitored yarn diameter or electrical property, the at least one electrode may be repositioned 1036 so as to maintain uniformity (as described above at or within +/−5%) of the monitored property or diameter.

FURTHER CONSIDERATIONS

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A method for dividing a nanofiber sheet, the method comprising:
   providing a nanofiber sheet comprising a plurality of nanofiber oriented parallel to a direction in which the nanofiber sheet is drawn, the nanofiber sheet having a first major surface and a second major surface opposite the first major surface;
   positioning at least one electrode proximate to, and not in direct contact with, at least one of the major surfaces of the nanofiber sheet;
   applying a voltage to the at least one electrode proximate to the at least one major surface of the nanofiber sheet;
   generating an electrical discharge at the at least one electrode from the applied voltage; and
   using the electrical discharge, dividing the nanofiber sheet into two or more sub-sheets by removing a portion of the nanofiber sheet.

2. The method of claim 1, wherein positioning the at least one electrode proximate to, and not in direct contact with, a major surface of the nanofiber sheet includes generating a corona that removes the portion of the nanofiber sheet.

3. The method of claim 2, further comprising increasing a size of the portion of the nanofiber sheet that is removed by increasing a magnitude of the applied voltage.

4. The method of claim 1, wherein positioning the at least one electrode further comprises:

placing a first arc discharge electrode proximate to, and not in direct contact with, a first major surface of the nanofiber sheet;

placing a second arc discharge electrode proximate to, and not in direct contact with, a second major surface of the nanofiber sheet, wherein the voltage is applied to at least one of the first arc discharge electrode and the second arc discharge electrode; and responsive to the applied voltage, causing an electrical arc to flow between the first arc discharge electrode and the second arc discharge electrode.

5. The method of claim 1, further comprising:

identifying an inhomogeneity in the nanofiber sheet; and positioning the at least one electrode proximate to, and not in direct contact with, the inhomogeneity in the nanofiber sheet.

6. The method of claim 5, wherein dividing the nanofiber sheet comprises dividing the nanofiber sheet into at least a first sub-sheet and a second sub-sheet, wherein the inhomogeneity is disposed entirely within the first sub-sheet.

7. The method of claim 5, wherein the inhomogeneity is a tear in the nanofiber sheet.

8. The method of claim 5, wherein the inhomogeneity is a variation in a number of nanofibers per unit volume of the nanofiber sheet.

9. The method of claim 1, further comprising:

spinning a nanofiber yarn from at least one of two or more sub-sheets;

monitoring one or more of a diameter and an electrical property of the nanofiber yarn during the spinning; and re-positioning the at least one electrode proximate to, and not in direct contact with, the nanofiber sheet in response to the monitored diameter or electrical properties of the nanofiber yarn, the re-positioning changing a width of the two or more sub-sheets by relocating the electrical discharge.

10. The method of claim 9, wherein re-positioning the at least one electrode reduces a variation in diameter of the nanofiber yarn to less than +/−5% over a length of 1 mm.

11. The method of claim 1, wherein at least one of the two or more sub-sheets is less than 5 µm in width.

12. The method of claim 11, further comprising spinning a nanofiber yarn less than 1 µm in diameter from the sub-sheet less than 5 µm in width.

13. The method of claim 11, further comprising simultaneously spinning a separate nanofiber yarn from each of the at least two or more sub-sheets.

14. The method of claim 1, wherein the nanofiber sheet is a carbon nanofiber sheet and wherein carbon nanofibers of the carbon nanofiber sheet are multiwalled carbon nanofibers having a diameter of less than 100 nm.

15. The method of claim 1, wherein positioning the at least one electrode further comprises placing the at least one electrode proximate to, and not in direct contact with, a major surface of the nanofiber sheet, wherein the applied voltage generates an electrical arc between the at least one electrode and the nanofiber sheet, the electrical arc removing the portion of the nanofiber sheet.

* * * * *